United States Patent
Cha

(10) Patent No.: US 7,349,817 B2
(45) Date of Patent: Mar. 25, 2008

(54) APPARATUS AND METHOD FOR REDUCING PEAK-TO-AVERAGE POWER RATIO IN A BROADBAND WIRELESS COMMUNICATION SYSTEM

(75) Inventor: Sung-Keun Cha, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/407,750

(22) Filed: Apr. 20, 2006

(65) Prior Publication Data

US 2006/0247898 A1 Nov. 2, 2006

(30) Foreign Application Priority Data

Apr. 20, 2005 (KR) .................. 10-2005-0032557

(51) Int. Cl.
*G01R 13/00* (2006.01)
(52) U.S. Cl. .................. 702/66; 702/60; 370/208; 370/210
(58) Field of Classification Search .................. None
See application file for complete search history.

(56) References Cited

U.S. PATENT DOCUMENTS

| | | | |
|---|---|---|---|
| 6,741,661 B2* | 5/2004 | Wheatley et al. | 375/296 |
| 2002/0012403 A1* | 1/2002 | McGowan et al. | 375/295 |
| 2004/0042559 A1* | 3/2004 | Jaenecke et al. | 375/297 |
| 2004/0218689 A1* | 11/2004 | Akhtman | 375/296 |

* cited by examiner

*Primary Examiner*—Bryan Bui
*Assistant Examiner*—Jonathan Moffat
(74) *Attorney, Agent, or Firm*—The Farrell Law Firm, PC

(57) ABSTRACT

An apparatus and method for PAPR reduction in a wireless communication system are provided. In the PAPR reducing apparatus, a first calculator calculates an ISF for each sample of baseband sample data. A successive peak detector adjusts the ISF of the each sample according to the spacing between successive peak samples. A second calculator subtracts the ISF of each sample received from the successive peak detector from a predetermined value. A window convolution calculator calculates a convolution of the difference received from the second calculator and a predetermined window function, and outputs a window operation value of each sample.

24 Claims, 9 Drawing Sheets

APPARATUS AND METHOD FOR REDUCING PEAK-TO-AVERAGE POWER RATIO IN A BROADBAND WIRELESS COMMUNICATION SYSTEM

PRIORITY

This application claims priority under 35 U.S.C. § 119 to an application entitled "Apparatus and Method for Reducing Peak-to-Average Power Ratio in a Broadband Wireless Communication System" filed in the Korean Intellectual Property Office on Apr. 20, 2005 and assigned Serial No. 2005-32557, the contents of which are incorporated herein by reference.

BACKGROUND OF THE INVENTION

1. Field of the Invention

The present invention relates generally to a Multi-Carrier Modulation (MCM) communication system, and in particular, to an apparatus and method for reducing Peak-to-Average Power Ratio (PAPR) in an Orthogonal Frequency Division Multiplexing (OFDM) system.

2. Description of the Related Art

OFDM is a special case of MCM, in which a serial symbol sequence is, prior to transmission, converted to parallel symbol sequences and modulated to mutually orthogonal sub-carriers.

The first MCM systems appeared in the late 1950's for military High Frequency (HF) radio communications, and OFDM with overlapping orthogonal sub-carriers was initially developed in the 1970's. In view of difficulty in maintaining orthogonal modulation between multiple carriers, OFDM has limitations in applications to real systems. However, in 1971, Weinstein, et al. proposed an OFDM scheme that applies Discrete Fourier Transform (DFT) to parallel data transmission as an efficient modulation/demodulation process, which was a driving force behind the development of OFDM. Also, the introduction of a guard interval and a cyclic prefix as the guard interval further mitigated adverse effects of multi-path propagation and delay spread on systems.

Accordingly, OFDM has been exploited in a wide variety of fields of digital data communications such as Digital Audio Broadcasting (DAB), digital television broadcasting, Wireless Local Area Network (WLAN), and Wireless Asynchronous Transfer Mode (WATM).

OFDM, similar to traditional Frequency Division Multiplexing (FDM), boasts of optimum transmission efficiency in high-speed data transmission because first of all, it transmits data on sub-carriers, maintaining orthogonality among them. Overlapping frequency spectrums leads to efficient frequency and robustness against multi-path fading.

Despite the above-described benefits, OFDM has the distinctive drawback that MCM causes a high PAPR. Since data is transmitted on multiple subcarriers, the amplitude of a final OFDM signal is the sum of the amplitudes of individual subcarriers and thus fluctuates significantly. Moreover, if the subcarriers are in phase, this results in a very high amplitude fluctuation. As a consequence, the signal is out of the linear operation range of a high power amplifier in a Radio Frequency (RF) processor, and after passing through the high power amplifier, signal distortion is produced. In this context, many techniques have been proposed for PAPR reduction.

Traditionally, there are two main kinds of PAPR reduction methods: transparent methods and side information methods. In the transparent methods, a transmitter reduces PAPR and a receiver recovers a signal transmitted by the transmitter without any associated information. In the side information methods, the receiver recovers the transmitted signal using side information existing in the received signal. The transparent methods can be implemented in compliance with existing standards, including clipping and filtering, and peak windowing. The side information methods require standardization before the system is designed. Coding, Selective Mapping (SLM), and Partial Transmit Sequence (PTS) are side information methods.

Clipping and Filtering: The parts of a baseband signal which have magnitudes above a threshold are mapped to a predetermined value or clipped, while the parts of the baseband signal with magnitudes at or below the threshold are passed through the filtering and clipping. After the resulting signal is made smooth by filtering, it is input to an amplifier. This approach is very simple in terms of system implementation, but despite the use of a filter, hard clipping-caused distortion of frequency spectrum interferes with an adjacent frequency band. Moreover, the clipped signal increases the PAPR during the filtering process.

Peak Windowing: The parts of a baseband signal whose magnitudes below a threshold are multiplied by '1' and thus transmitted as the original signal, while predetermined impulses are created for the parts of the baseband signal with magnitudes at or above the threshold, a convolution of the impulses and a window is subtracted from '1', and then the resulting signal is multiplied by the original signal, thereby limiting peaks to or below a predetermined threshold. This technique does not need side information and has good frequency spectrum when the window size increases. However, when peaks exceeding the threshold successively exist at smaller intervals than the window size W, the amplitude of the original signal is over-limited and thus average Bit Error Rate (BER) is increased during the period of the original signal.

SLM: Data of N OFDM symbol periods is multiplied by statistically independent M pairs of sequences (length N) and Inverse-Fast-Fourier-Transform (IFFT)-processed. The PAPRs of the IFFT signals are calculated and data is transmitted using a sequence with the lowest PAPR. Information about the sequence is also transmitted as side information. Due to the IFFT process, transmitter complexity increases by almost a factor of M and the transmission of side information is rather constraining.

PTS: Like SLM, PTS relies on the linearity of IFFT. A frequency-domain input signal is divided into M subblocks and N-point IFFT-processed. Each subblock is multiplied by a phase factor so that its PAPR is minimized and then the subblocks are summed. Since M IFFTs are required and the computation volume of calculating phase factors significantly increases with the number of subblocks, high-speed information transmission cannot be achieved. In addition, side information must be transmitted as in SLM.

Among the above techniques, peak windowing will be described in more detail.

Peak windowing is one of techniques proposed to improve spectrum distortion caused by clipping. In the clipping technique for limiting the amplitude of an input signal to a high-power amplifier, hard clipping of a particular amplitude area degrades out-of-band radiation characteristics in the frequency spectrum. The out-of-band radiation characteristics are improved by windowing the clipped area and thus smoothing a time-domain signal in the peak windowing technique, as illustrated in FIG. 1. In the conventional peak windowing, the amplitude of a clipped signal is expressed as Equation (1):

$$|x_s(n)| = c(n) \cdot |x(n)| \quad (1)$$

$$c(n) = \begin{cases} 1, & |x(n)| \le A \\ \dfrac{A}{|x_n|}, & |x(n)| > A \end{cases}$$

where n is a sample index of a discrete signal, x(n) is a baseband signal after IFFT, $x_s(n)$ is a clipped signal, A is a threshold for clipping, and c(n) is a scaling factor for PAPR reduction.

The scaling factor is given by Equation (2):

$$s(n) = 1 - \sum_{k=-\infty}^{\infty} a(k)w(n-k) \quad (2)$$

$$a(k) = 1 - c(k)$$

$$= \begin{cases} 0, & |x(n)| \le A \\ 1 - \dfrac{A}{|x(n)|}, & |x(n)| > A \end{cases}$$

where s(n) is the scaling factor, w(n) is a window function (e.g. Hamming, Hanning, and Kaiser windows), and a(k) is a weighting coefficient. s(n) can be simplified to Equation (3):

$$s(n) = 1 - \sum_{k=-\infty}^{\infty} [1 - c(k)]w(n-k) \quad (3)$$

FIG. 2 illustrates the conventional peak windowing. The waveform of a baseband signal is shown in the upper part of the drawing, and the scaling factor s(n) for eliminating peaks (|x(k)|) at or above a threshold (=A) is shown in the lower part.

Referring to FIG. 2, the scaling factor s(n) to be multiplied by the amplitude x(n) of the baseband signal is set to '1' when x(n) is less than A. If x(n) is greater than A, an impulse is generated according to the ratio of the amplitude of an input signal at a peak to the threshold and a convolution of the impulse and a predetermined window is subtracted from '1'. The resulting signal is set as s(n). The convolution can be implemented by use of a Finite Impulse Response (FIR) filter.

Consequently, the peak windowing technique is expressed as Equation (4):

$$|x_s(n)| = s(n) \cdot |x(n)| \quad (4)$$

When peaks exceeding the threshold appear at smaller intervals than the window size W, scaling factors are overlapped with each other, as indicated by reference character (a) in FIG. 3. Therefore, the amplitude of the original signal is restricted more than desired. Moreover, the scaling factors become negative values, thereby causing problematic errors to the system. This problem is more or less overcome by inserting a Blocking Negative Value (BNV) and adding feedback to a window of a FIR filter structure.

However, this peak windowing technique using feedback still has the problem of excess limitation of the amplitude of the original signal due to the overlapped scaling factors, when peaks are generated at smaller intervals than a window size. In this case, the average BER of the receiver is increased.

Referring to FIG. 7, in a conventional waveform denoted by AFTER PEAK WINDOWING, when peaks at or above a threshold are created at smaller intervals than a window size, they are controlled so as not to exceed the threshold. However, if peaks at or above the threshold appear successively, their amplitudes are restricted too much. As a result, the average BER of the receiver is increased, as described before.

SUMMARY OF THE INVENTION

An object of the present invention is to substantially solve at least the above problems and/or disadvantages and to provide at least the advantages below. Accordingly, an object of the present invention is to provide an apparatus and method for reducing PAPR in a multi-carrier communication system.

Another object of the present invention is to provide an apparatus and method for reducing PAPR by improved peak windowing in a multi-carrier communication system.

A further object of the present invention is to provide an apparatus and method for preventing excess reduction of the amplitude of an original signal when peaks at or above a threshold appear at smaller intervals than a window size in a multi-carrier communication system for PAPR reduction based on peak windowing.

Still another object of the present invention is to provide an apparatus and method for reducing PAPR by improved peak windowing so as to decrease average BER, while maintaining spectral characteristics in a multi-carrier communication system.

The above objects are achieved by providing an apparatus and method for PAPR reduction in a broadband wireless communication system.

According to one aspect of the present invention, in an apparatus for reducing the PAPR of a transmission signal in a broadband wireless communication system, a first calculator calculates an Intermediate Scale Factor (ISF) for each sample of baseband sample data. A successive peak detector adjusts the ISF of the each sample according to the spacing between successive peak samples. A second calculator subtracts the ISF of the each sample received from the successive peak detector from a predetermined value to output a difference. A window convolution calculator calculates a convolution of the difference received from the second calculator and a predetermined window function and outputs a window operation value for each sample.

According to another aspect of the present invention, in a method of reducing the PAPR of a transmission signal in a broadband wireless communication system, the ISF of each sample of baseband sample data is calculated and adjusted according to the spacing between successive peak samples. The adjusted ISF of the each sample is subtracted from a predetermined value and a window operation value for each sample is created by performing a predetermined window convolution on the difference.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method of reducing PAPR through improved peak windowing in a multi-carrier communication system. The improved peak windowing technique is designed to prevent excess restriction (loss) of the amplitude of an original signal, when peaks appear at smaller intervals than a window size.

Figure 1:
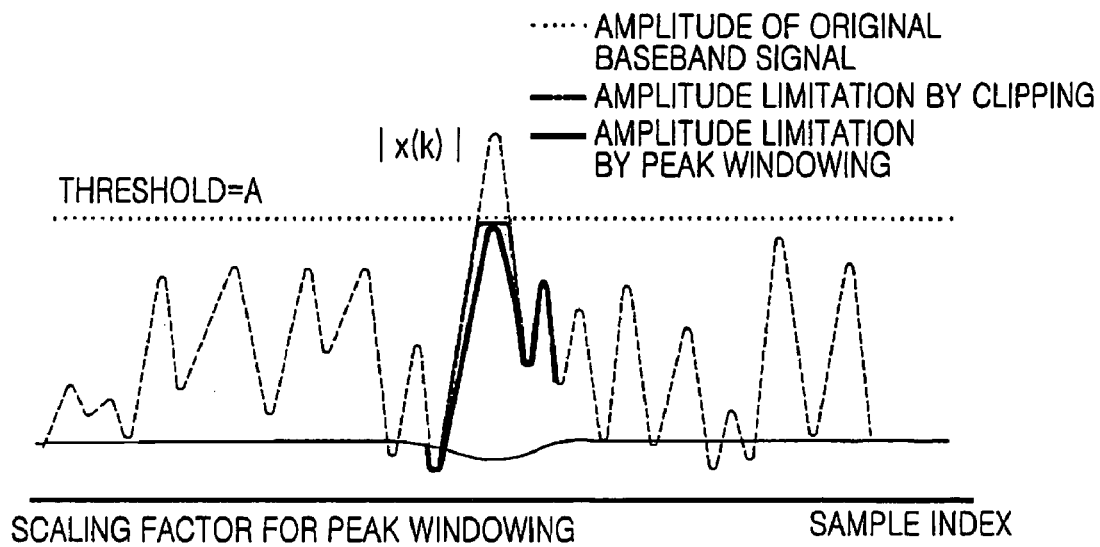
FIG. 1 is a view comparing a conventional peak windowing technique with a conventional clipping technique.
Figure 2:
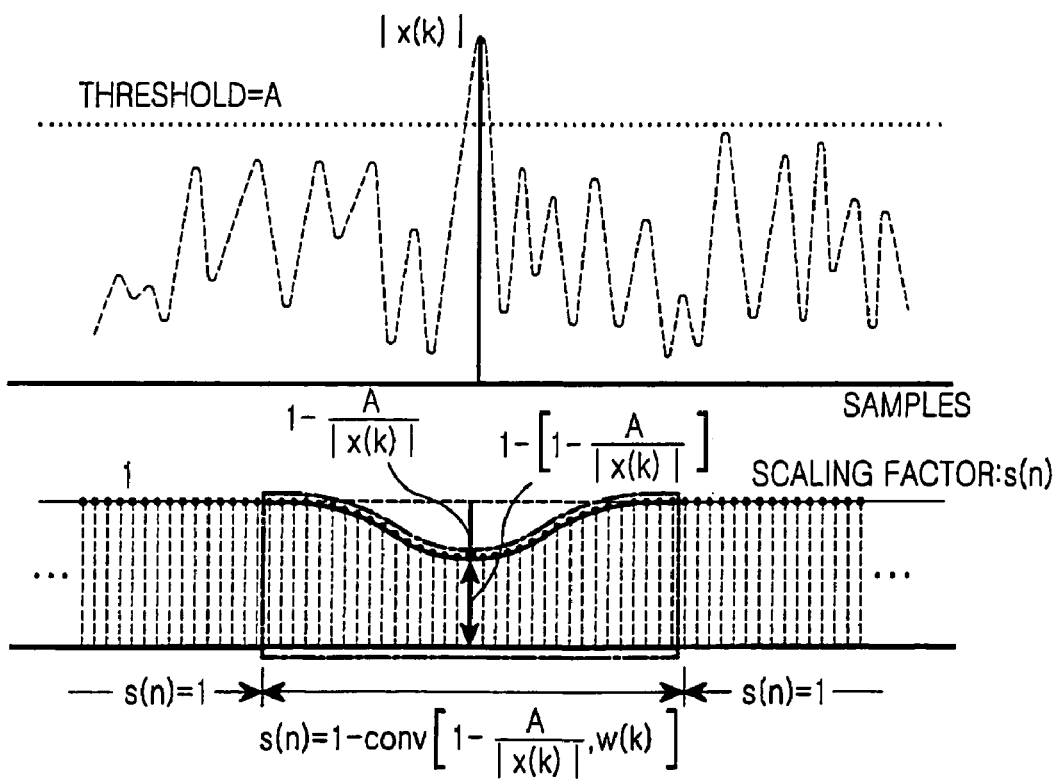
FIG. 2 illustrates the conventional peak windowing technique.
Figure 3:
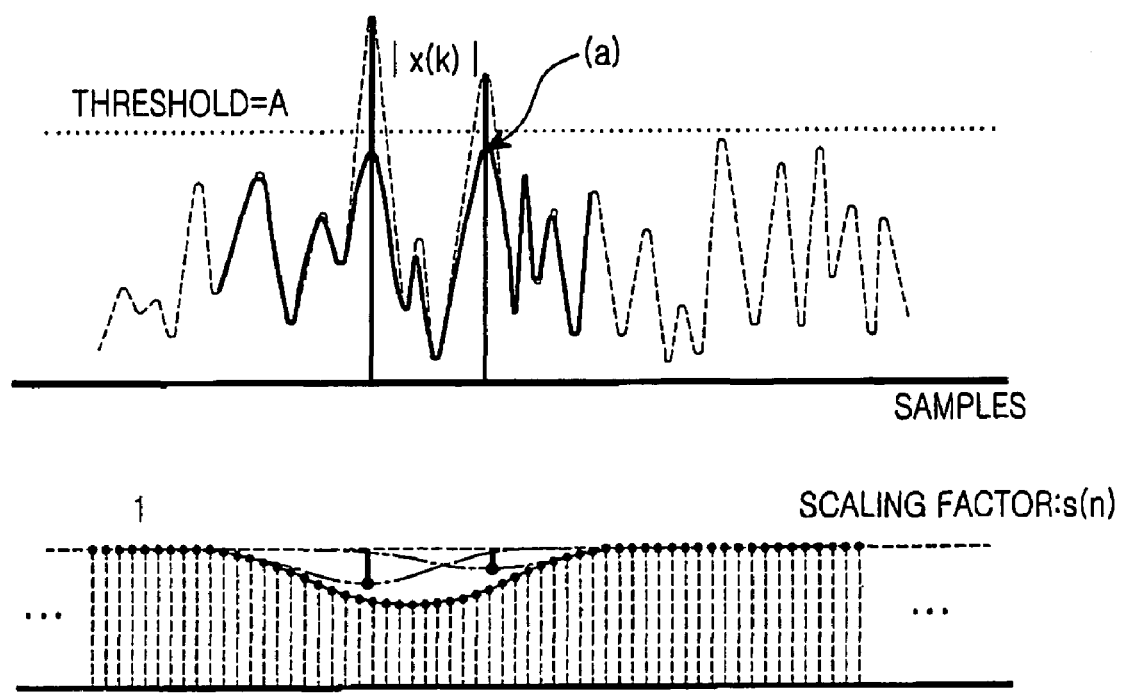
FIG. 3 illustrates a problem encountered with the conventional peak windowing when peaks are generated at smaller intervals than a window size.
Figure 4:
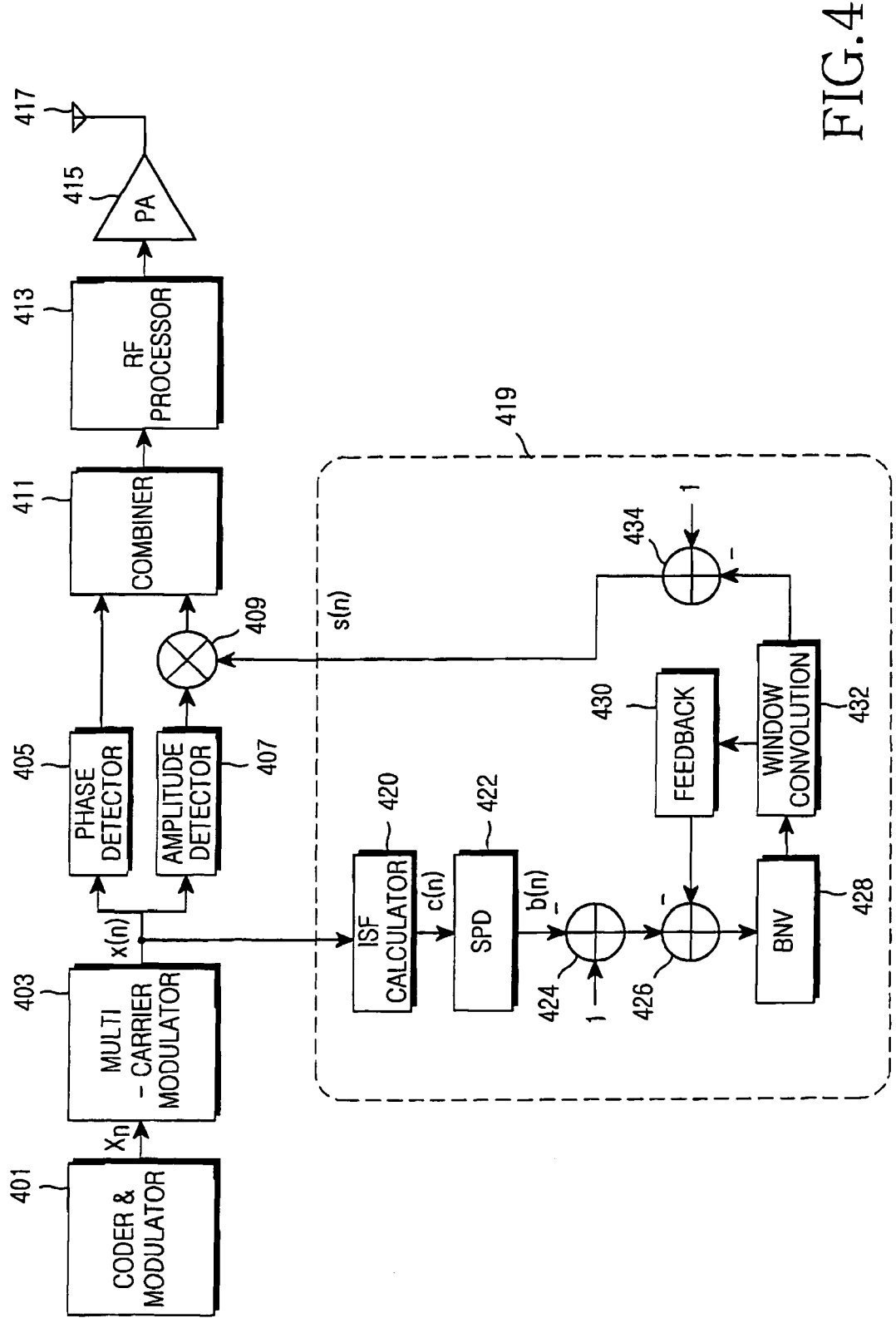
FIG. 4 is a block diagram of a transmitter in a multi-carrier communication system according to the present invention.

FIG. 4 is a block diagram of a transmitter in a multi-carrier communication system according to the present invention.

Referring to FIG. 4, the transmitter includes a coder and modulator 401, a multi-carrier modulator 403, a phase detector 405, an amplitude detector 407, a multiplier 409, a combiner 411, an RF processor 413, a power amplifier 415, an antenna 417, and an improved peak windowing portion 419. According to the present invention, the improved peak windowing portion 419 has an Intermediate Scale Factor (ISF) calculator 420, a Successive Peak Detector (SPD) 422, a first adder 424, a second adder 426, a BNV portion 428, a feedback portion 430, a window convolution calculator 432, and a third adder 434.

In operation, the coder and modulator 401 encodes an input information bit stream based on a coding method and modulates the coded symbols according to a modulation scheme. The coder and modulator 401 may be configured to have an encoder and a modulator. The encoder can be a convolutional coder, a turbo coder, or a Low Density parity Check (LDPC) coder. The modulation scheme is one of Binary Phase Shift Keying (BPSK), Quadrature Phase Shift Keying (QPSK), 8ary Quadrature Amplitude Modulation (8QAM), and 16QAM.

The multi-carrier modulator 403 generates time sample data by modulating complex symbols received from the coder and modulator 401 to multiple carriers. For example, the multi-carrier modulator 403 can be an IFFT processor. In this case, the multi-carrier modulator 403 creates OFDM symbol data by IFFT-processing the received symbols.

The phase detector 405 detects the phase of each sample received from the multi-carrier modulator 403, stores the detected phase, and outputs the phase at a predetermined time instant. The amplitude detector 403 detects the amplitude of each sample received from the multi-carrier modulator 403, stores the detected amplitude, and outputs the amplitude at a predetermined time instant.

The multiplier 409 multiplies the amplitudes received from the amplitude detector by scaling factors received from the improved peak windowing portion 419. The combiner 411 combines the phases received from the phase detector 405 with the products received from the multiplier 409, thereby creating a final baseband complex signal (sample data).

The RF processor 413 converts the sample data received from the combiner 411 to an analog signal and RF-processes the analog signal. The power amplifier 415 amplifies the RF signal received from the RF processor 413 and transmits it through the antenna 417.

The improved peak windowing portion 419 will be described below in great detail.

The ISF calculator 420 calculates an ISF c(n) for the baseband signal from the multi-carrier modulator 403 by Equation (5):

$$c(n) = \begin{cases} 1, & |x(n)| \leq A \\ \dfrac{A}{|x_n|}, & |x(n)| > A \end{cases} \quad (5)$$

where n is a sample index of a discrete signal, x(n) is a baseband signal after IFFT, and A is a threshold for clipping.

The SPD 422 detects peaks at or above the threshold A by checking the ISFs c(n) received from the ISF calculator 420 and compares the spacing between successive peak samples with a window size W. If the spacing is greater than W, scaling factors are not overlapped with each other. Thus, the SPD 422 simply passes c(n). If the spacing is equal to or less than W, the SPD 422 multiplies c(n) by a predetermined weighting value α in order to prevent excess loss of the amplitude of the original signal caused by successive windowing. That is, the SPD 422 just outputs c(n) if an $n^{th}$ sample is not a peak and adjusts c(n) by the Equation (6) if the $n^{th}$ sample is a peak (an $(i+1)^{th}$ peak).

$$b(n) = \begin{cases} c(n), & P_{i+1} - P_i > W \\ \alpha \cdot c(n), & P_{i+1} - P_i \leq W \end{cases} \quad (6)$$

where $P_i$ is the sample index of an $i^{th}$ peak (the previous peak) and W is the window size represented as the number of samples. The weighting value α is greater than '1'. As α approaches '1', the effects of the conventional peak windowing are achieved. As α is greater than '1', the number of amplitude-limited peaks at or above a threshold increases. The weighting value α can be chosen according to the linearity of a final amplifier and it is preferable to set α so that the spectral characteristics of the amplifier are not affected. While application of the weighting value α may lead to peaks slightly exceeding the threshold in a signal after peak windowing, it advantageously decreases average BER. That is, the use of α reduces the average BER, achieving a target PAPR.

The first adder 424 inverts the sign of the output of the SPD 422 and adds the sign-inverted value with '1'. This means that the first adder 424 subtracts the output of the SPD 422 from '1'.

The adder 426 inverts the sign of the output of the feedback portion 430 and adds the sign-inverted value to the output of the first adder 424. That is the output of the feedback portion 432 is subtracted from the output of the first adder 424.

The BNV portion 428 compares the output of the second adder 426 with '0' and outputs the greater of the two. That is, when many successive peaks exist, the output of the second adder 426 can be a negative-signed value at worst, The BNV portion 428 prevents input of a negative-signed value to the window convolution calculator 433.

The feedback portion 430 multiplies the outputs of some of a plurality of shift registers in the window convolution calculator 432 by predetermined values, sums the products, and provides the sum to the second adder 426. That is, the feedback portion 430 feeds back part of a convolution calculated in the window convolution calculator 432, thereby preventing excess scaling of the original signal.

The window convolution calculator 432 computes a convolution of the value received from the BNV portion 428 with a predetermined window function w(n). The third adder 434 inverts the sign of the convolution and adds the sign-inverted convolution to '1'. In other words, the third adder 434 subtracts the convolution from '1'. The output of the third adder 434, s(n) is expressed as Equation (7):

$$s(n) = 1 - \sum_{k=-\lfloor \frac{W}{2} \rfloor}^{\lfloor \frac{W}{2} \rfloor} [1 - b(k)]w(n-k) \quad (7)$$

where [1−b(k)] is an impulse value input to the window convolution calculator 432, W(n) is the window function, and W is the window size.

As described before, the multiplier 409 acquires a final sample value by multiplying the amplitude of the original signal, |x(n)| by the scaling factor s(n) from the third adder 434, as shown in Equation (8):

$$|x_s(n)| = s(n) \cdot |x(n)| \quad (8)$$

where s(n) is the scaling factor calculated according to the improved peak windowing according to the present invention, |x(n)| is the amplitude of the original signal, and |$x_s$(n)| is the amplitude of the scaled signal by the improved peak windowing.

Figure 5:
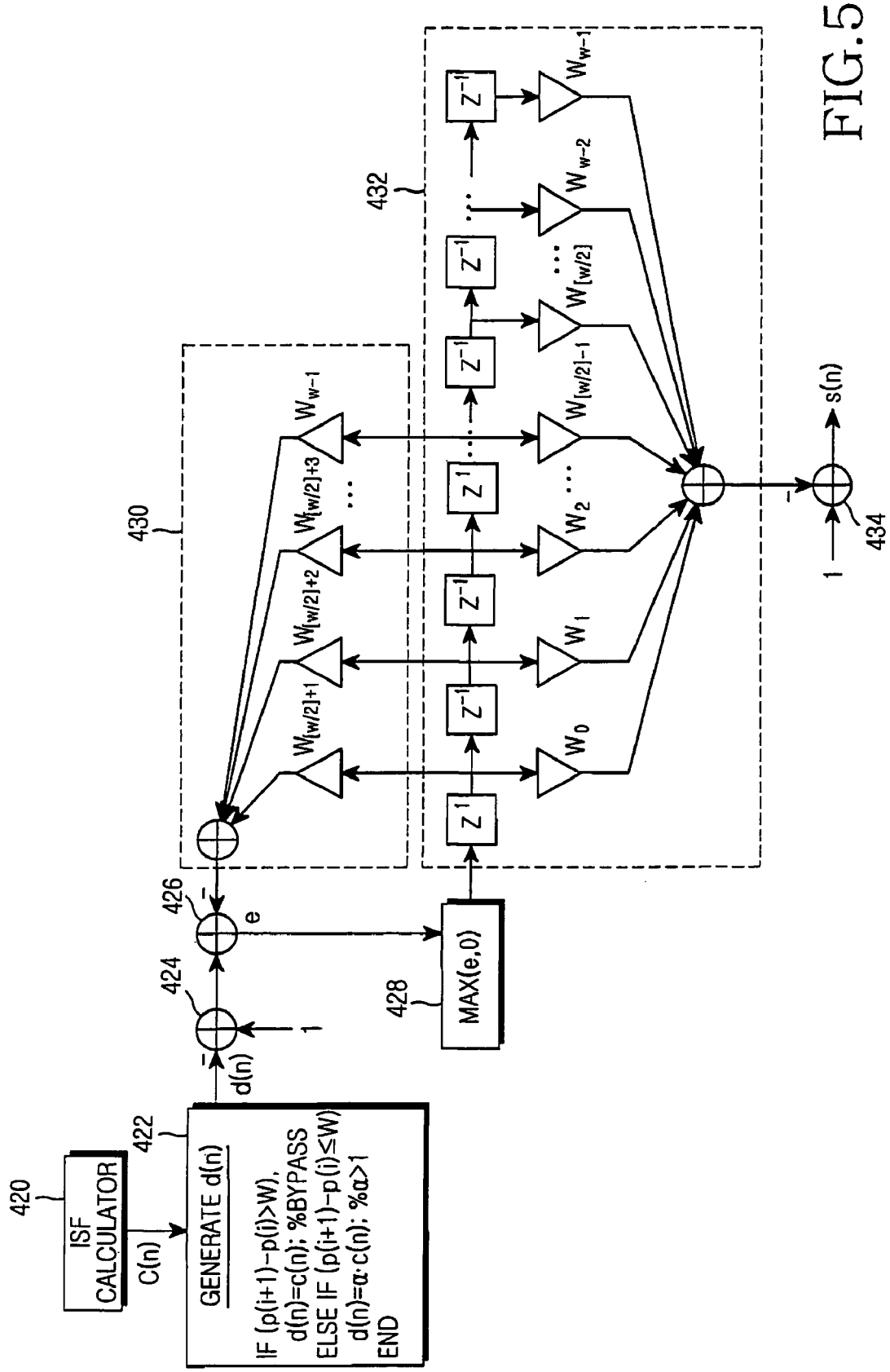
FIG. 5 is a detailed block diagram of an improved peak windowing portion illustrated in FIG. 4.

FIG. 5 is a detailed block diagram of an improved peak windowing portion illustrated in FIG. 4.

Referring to FIG. 5, the improved peak windowing portion 419 is characterized by application of the weighting value α to the output of the ISF calculator 420 according to peak interval.

Referring to FIG. 5, the improved peak windowing portion 419 has an Intermediate Scale Factor (ISF) calculator 420, a Successive Peak Detector (SPD) 422, a first adder 424, a second adder 426, a BNV portion 428, a feedback portion 430, a window convolution calculator 432, and a third adder 434.

The ISF calculator 420 calculates an ISF c(n) for the baseband signal from the multi-carrier modulator 403 as described above. The SPD 422 detects peaks at or above the threshold A and compares the spacing between successive peak samples with a window size W. If the spacing is greater than W, the SPD 422 simply passes c(n). If the spacing is equal to or less than W, the SPD 422 multiplies c(n) by a predetermined weighting value α. The weighting value α is greater than '1'. As α is greater than '1', the number of amplitude-limited peaks at or above a threshold increases. While application of the weighting value α may lead to peaks slightly exceeding the threshold in a signal after peak windowing, it advantageously decreases average BER.

The first adder 424 subtracts the output of the SPD 422 from '1'.

The adder 426 subtracts the output of the feedback portion 430 from the output of the first adder 424.

The BNV portion 428 compares the output of the second adder 426 with '0' and outputs the greater of the two.

The feedback portion 430 multiplies the outputs of some of a plurality of shift registers in the window convolution calculator 432 by predetermined values, sums the products, and provides the sum to the second adder 426.

The window convolution calculator 432 computes a convolution of the value received from the BNV portion 428 with a predetermined window function w(n). The third adder 434 subtracts the convolution from '1'.

Figure 6:
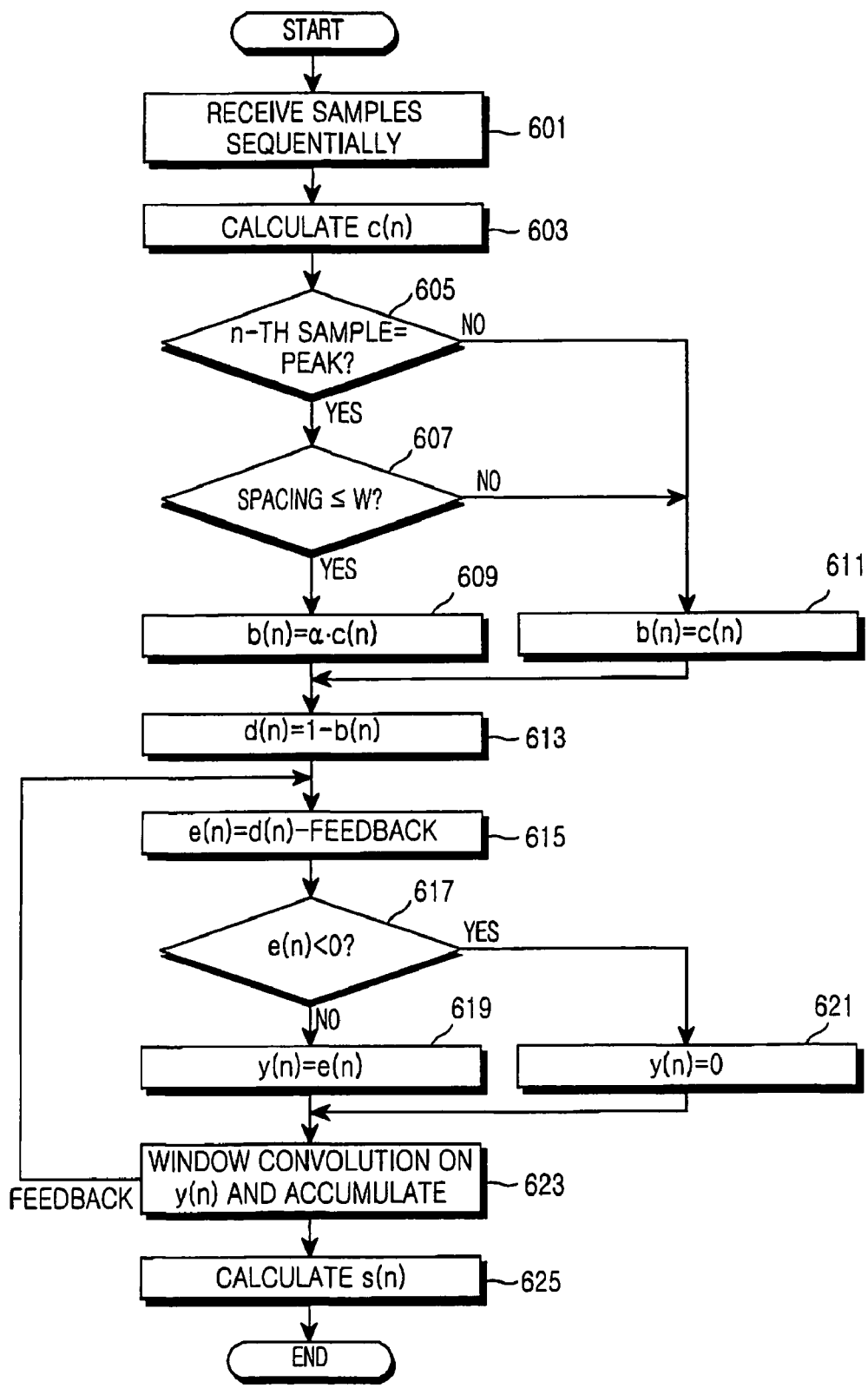
FIG. 6 is a flowchart illustrating an improved peak windowing operation according to the present invention.

FIG. 6 is a flowchart illustrating an improved peak windowing operation according to the present invention.

Referring to FIG. 6, the improved peak windowing portion 419 receives IFFT samples sequentially in step 601. When the improved peak windowing portion 419 starts to receive the samples, it calculates an ISF c(n) for each sample in step 603. If the amplitude of an $n^{th}$ sample is less than or equal to the scaling threshold A, c(n) is set to '1', and if the amplitude is greater than A, c(n) is set to $$\frac{A}{|x(n)|}.$$

When the ISF calculation starts, the improved peak windowing portion 419 determines whether the $n^{th}$ sample is a peak by checking c(n), that is, whether c(n) is a value other than '1' in step 605. If the $n^{th}$ sample is not a peak, the improved peak windowing portion 419 sets b(n) to c(n) in step 611 and proceeds to step 613. On the other hand, if the $n^{th}$ sample is a peak, the improved peak windowing portion 419 compares the spacing between the nth sample and the previous peak with the window size W in step 607. If the spacing is greater than W, the improved peak windowing portion 419 sets b(n) to c(n) in step 611 and proceeds to step 613. If the spacing is less than or equal to W, the improved peak windowing portion 419 sets b(n) to α·c(n) in step 609 and goes to step 613.

When the calculation of b(n) starts, the improved peak windowing portion 419 calculates d(n) by subtracting b(n) from '1' in step 613. When the calculation of d(n) starts, the improved peak windowing portion 419 calculates e(n) by applying a feedback value resulting from a window convolution operation to d(n) in step 615. When e(n) starts to be calculated, the improved peak windowing portion 419 checks the sign of e(n) in step 617. If e(n) is negative-signed, the improved peak windowing portion 419 sets a window convolution input y(n) to '0' in step 621. If e(n) is positive-signed, the improved peak windowing portion 419 sets y(n) to e(n) in step 619.

When y(n) starts to be calculated, the improved peak windowing portion 419 generates W impulse values by calculating a convolution of y(n) and a predetermined window, and generates a window operation value for each sample by accumulating the W impulse values on a sample basis in step 623. In step 625, the improved peak windowing portion 419 calculates a final scaling factor s(n) by subtracting the window operation value of each sample from '1'.

A comparison between the improved peak windowing of the present invention and the conventional peak windowing in terms of spectral characteristics and BER will be presented below.

Figure 7:
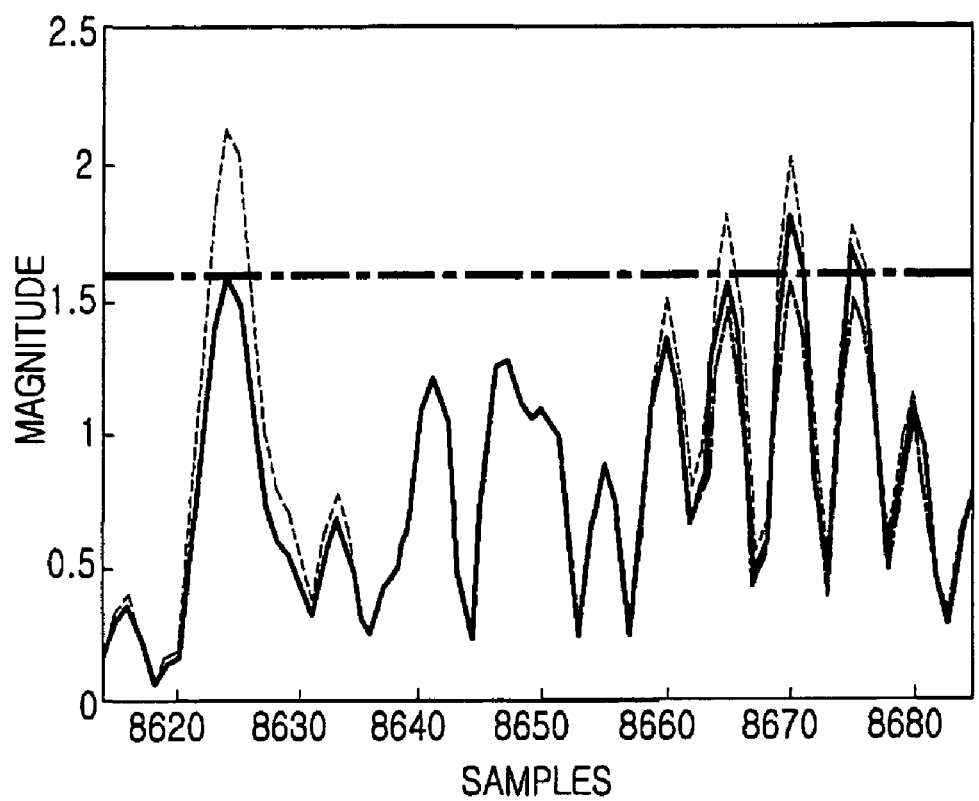
FIG. 7 is a graph comparing the improved peak windowing of the present invention with the conventional peak windowing in terms of scaled signals.

FIG. 7 is a graph comparing the improved peak windowing of the present invention with the conventional peak windowing in terms of scaled signals.

Referring to FIG. 7, when the spacing between peaks exceeding a threshold is greater than the window size W, the peaks are limited to the vicinity of the threshold, while when the spacing is less than W, overlap between convolutions lead to excess amplitude restriction in the conventional peak windowing technique. As a result, the average BER of the receiver is increased. In contrast, the improved peak windowing of the present invention limits the amplitudes of peaks to a little over the threshold. That is, excess signal loss caused by overlap between convolutions is prevented, thereby decreasing the average BER.

In this way, even though the amplitudes of limited peaks are slightly above the threshold, spectral characteristics are kept unchanged. Therefore, the problem of degraded radiation characteristics is not created.

Figure 8:
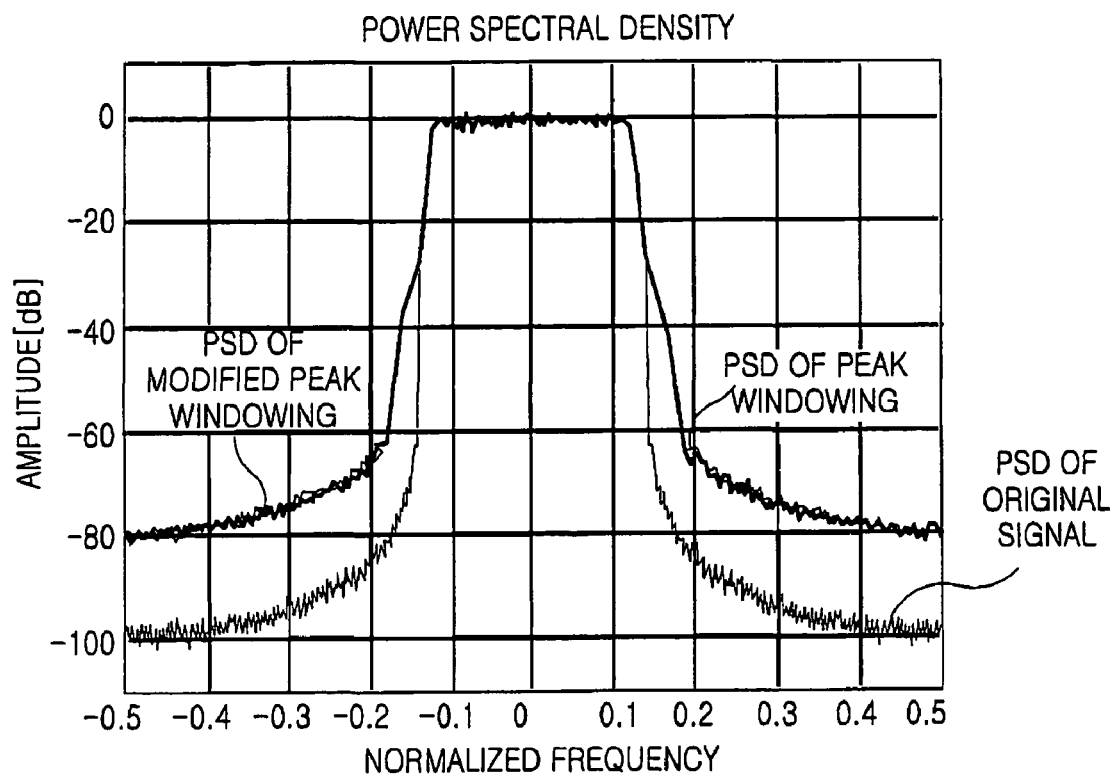
FIG. 8 is a graph comparing the improved peak windowing of the present invention with the conventional peak windowing in terms of baseband power spectrum.

FIG. 8 is a graph comparing the improved peak windowing of the present invention with the conventional peak windowing in terms of baseband power spectrum. Referring to FIG. 8, it is noted that there is no difference in Power Spectral Density (PSD) between a signal with the conventional peak windowing and a signal with the improved peak windowing of the present invention.

Figure 9:
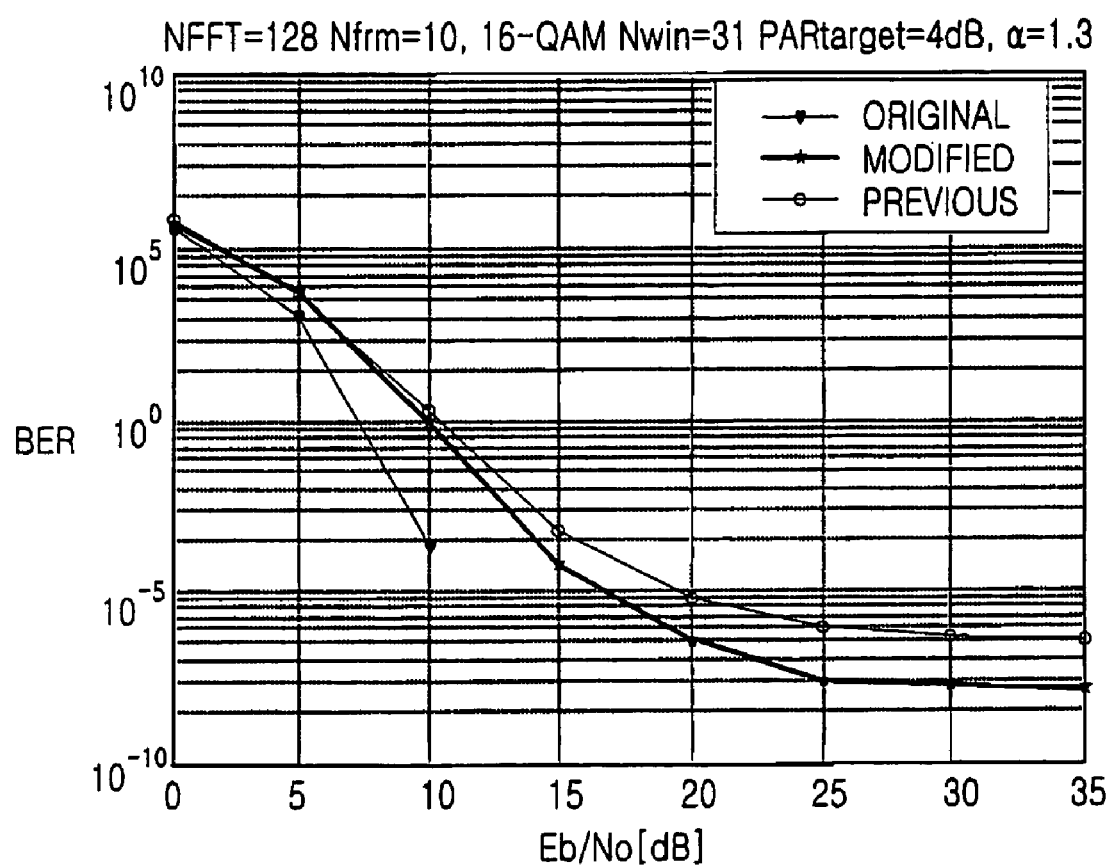
FIG. 9 is a graph comparing the improved peak windowing of the present invention with the conventional peak windowing in terms of baseband BER.

FIG. 9 is a graph comparing the improved peak windowing of the present invention with the conventional peak windowing in terms of baseband BER.

<Simulation Conditions>
total number of subcarriers ($N_{FFT}$)=128
average BER calculation unit (Nfrm)=10 frames
modulation=16QAM
window size ($N_{win}$)=31
target PAPR=4 dB
weighting value ($\alpha$)=1.3

Referring to FIG. 9, the improved peak windowing outperforms the conventional peak windowing in average BER.

Figure 10:
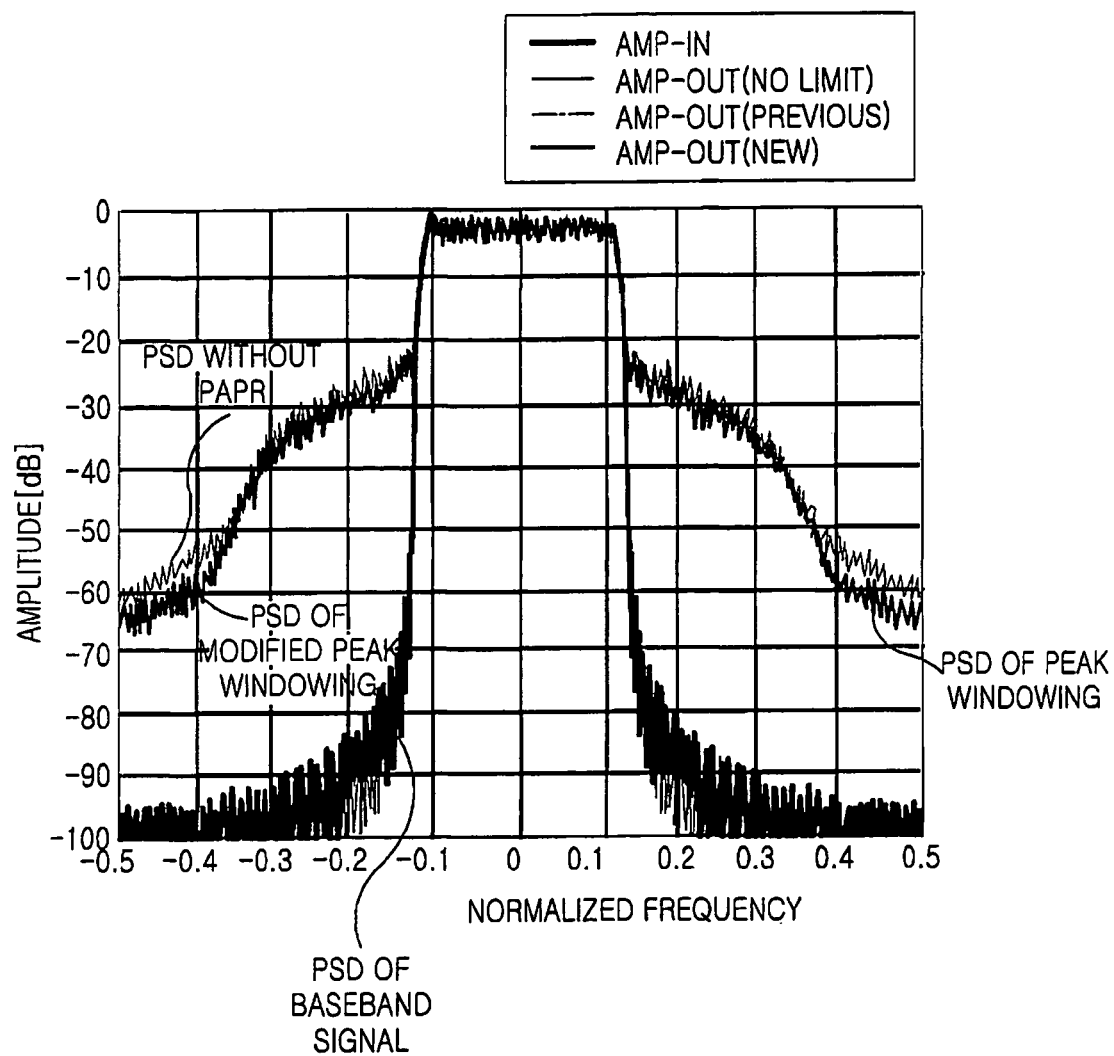
FIG. 10 is a graph comparing the improved peak windowing of the present invention with the conventional peak windowing in terms of power spectral density, when a signal passes through an amplifier with the same characteristics.

FIG. 10 is a graph comparing the improved peak windowing of the present invention with the conventional peak windowing in terms of PSD, when a signal passes through an amplifier with the same amplitude characteristic )AM-AM) and the same phase characteristic (AM-PM). This simulation is intended to reveal that spectral efficiency is not decreased in the improved peak windowing, compared to the conventional peak windowing, when a signal passes through an actual amplifier. Under the same average power, the spectral characteristics of amplitude-limited baseband signals according to the improved peak windowing and the conventional peak windowing were simulated, after passing through the same amplifier.

The amplifier model used is a widely used Traveling Wave Tube Amplifier (TWTA) of Saleh with non-memory characteristics. In the Saleh model, the amplitude characteristics (AM-AM) representing the relationship between the amplitude of an input signal x(t), |x(t)| and the amplitude of an output signal y(t), |y(t)| are given as Equation (9):

$$\frac{\alpha_a |x(t)|}{1+\beta_a |x(t)|^2} \quad (9)$$

The phase characteristics (AM-PM) representing the phase difference between the input signal x(t) and the output signal y(t) ($\angle$y(t)−$\angle$x(t)) are given as Equation (10):

$$\frac{\alpha_\Phi |x(t)|}{1+\beta_\Phi |x(t)|^2} \quad (10)$$

Thus a final signal after passing through the high power amplifier has a changed amplitude and phase, expressed as Equation (11):

$$y(t) = \frac{\alpha_a |x(t)|}{1+\beta_a |x(t)|^2} \exp\left(j\left(\angle x(t) + \frac{\alpha_\Phi |x(t)|}{1+\beta_\Phi |x(t)|^2}\right)\right) \quad (11)$$

where $\alpha_a$ and $\beta_a$ are constants that determine the AM-AM amplitude and phase characteristics, and $\alpha_\Phi$ and $\beta_\Phi$ are constants that determine the AM-PM amplitude and phase characteristics.

Referring to FIG. 10, it is noted that there is no difference in PSD between a signal with the conventional peak windowing and a signal with the improved peak windowing of the present invention.

In this way, the improved peak windowing reduces PAPR and BER by minimizing signal distortion caused by a forced limitation of the signal amplitude using a window, while providing the same spectral characteristics, compared to the conventional peak windowing.

As described above, the improved peak windowing of the present invention reduces PAPR effectively without side information in an MCM communication system such as OFDM. Especially when peaks at or above a threshold exist successively at smaller intervals than a window size, the amplitude level of a signal is limited to slightly over the threshold using a scaling factor. Therefore, the average BER is remarkably decreased.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A wireless communication system for reducing the peak-to-average power ratio (PAPR) of a transmission signal, comprising:
   a first calculator for detecting baseband samples having magnitudes exceeding a threshold, calculating intermediate scaling factors (ISFs) for the detected samples, and setting the ISFs to '1' for undetected samples;
   a successive peak detector for determining whether each sample is a peak by checking the ISF of each sample, comparing the spacing between a previous peak and each sample with a predetermined window size, if each sample is a peak, multiplying the ISF of each sample by a weighting value, if the spacing is less than or equal to the window size, and outputting the ISF of each sample it each sample is not a peak or the spacing is greater than the window size;

a second calculator for subtracting the ISF of each sample received from the successive peak detector from a predetermined value to output a difference; and a window convolution calculator for calculating a convolution of the difference received from the second calculator and a predetermined window function, and outputting a window operation value of each sample.

2. The wireless communication system of claim 1, further comprising:

a feedback portion for multiplying outputs of a number of shift registers from among a plurality of shift registers in the window convolution calculator by predetermined values, and summing the products; and a third calculator for subtracting the sum received from the feedback portion from the output of the second calculator and outputting the difference to the window convolution calculator.

3. The wireless communication system of claim 1, further comprising a blocking negative value (BNV) portion for comparing a value input to the window convolution calculator with '0' and providing the greater of the input value and '0' to the window convolution calculator.

4. The wireless communication system of claim 1, wherein the first calculator calculates the ISF by $$c(n) = \begin{cases} 1, & |x(n)| \le A \\ \dfrac{A}{|x_n|}, & |x(n)| > A \end{cases}$$

where n is a sample index, A is a threshold, and |x(n)| is the magnitude of an $n^{th}$ sample.

5. The wireless communication system of claim 1, wherein if the $n^{th}$ sample is an $(i+1)^{th}$ peak, the successive peak detector adjusts the ISF by $$b(n) = \begin{cases} c(n), & P_{i+1} - P_i > W \\ \alpha \cdot c(n), & P_{i+1} - P_i \le W \end{cases}$$

where c(n) is the ISF, $P_i$ is the sample index of an $i^{th}$ peak, W is the window size represented as the number of samples, and a (>1) is a weighting value.

6. The wireless communication system of claim 1, further comprising:

a fourth calculator for generating a final scaling factor for each sample by subtracting the window operation value of each sample from a predetermined value; and a multiplier for scaling a peak by multiplying the final scaling factor by the magnitude of each sample.

7. The wireless communication system of claim 1, wherein the window function is one of Hamming, Hanning and Kaiser window functions.

8. A transmitter in a wireless communication system, comprising:

a multi-cater modulator for generating sample data by modulating transmission data to multiple carriers;

a calculator for detecting baseband samples having magnitudes exceeding a threshold, calculating Intermediate Scaling Factors (ISFs) for the detected samples, and setting the ISFs to '1' for undetected samples;

a scaling factor calculator for adjusting the ISF of each sample according to the spacing between successive peak samples, and generating a scaling factor for each sample by performing a window convolution based on the adjusted ISF;

a separator for separating a phase and an amplitude from each sample of the sample data;

a multiplier for scaling a peak sample by multiplying the amplitude of each sample by the scaling factor; and a combiner for generating a complex signal by combining the amplitude received from the multiplier with the phase received from the separator.

9. The transmitter of claim 8, further comprising:

a radio frequency (RF) processor for modulating the complex signal to an RF signal; and a power amplifier for amplifying the power of the RF signal and transmitting the amplified RF signal.

10. The transmitter of claim 8, wherein the scaling factor calculator comprises:

a successive peak detector for comparing the spacing between the peak samples with a predetermined window size, and adjusting the ISFs of the peak samples if the spacing is less than the window size;

a second calculator for subtracting the ISF of each sample from '1';

a window convolution calculator for calculating a convolution of the difference received from the second calculator and a predetermined window function; and a third calculator for generating the scaling factor of each sample by subtracting the output of the window convolution calculator from '1'.

11. The transmitter of claim 10, wherein the first calculator calculates the ISF by $$c(n) = \begin{cases} 1, & |x(n)| \le A \\ \dfrac{A}{|x_n|}, & |x(n)| > A \end{cases}$$

where n is a sample index, A is a threshold, and |x(n)| is the magnitude of an $n^{th}$ sample.

12. The transmitter of claim 10, wherein if the $n^{th}$ sample is an (i+1)th peak, the successive peak detector adjusts the ISF by $$b(n) = \begin{cases} c(n), & P_{i+1} - P_i > W \\ \alpha \cdot c(n), & P_{i+1} - P_i \le W \end{cases}$$

where c(n) is the ISF, $P_i$ is the sample index of an $i^{th}$ peak, W is the window size represented as the number of samples, and a (>1) is a weighting value.

13. The transmitter of claim 8, wherein the multi-carrier modulator is an inverse fast Fourier transform (IFFT) processor.

14. A method of reducing the peak-to-average power ratio (PAPR) of a transmission signal in a wireless communication system, comprising the steps of:

detecting baseband samples having magnitudes exceeding a threshold;

calculating Intermediate Scaling Factors (ISFs) for the detected samples and setting the ISFs to '1' for undetected samples;

determining whether the ISF of each sample is a peak by checking the ISF of each sample;

comparing the spacing between a previous peak and each sample with a predetermined window size, if each sample is a peak;

multiplying the ISF of each sample by a weighting value, if the spacing is less than or equal to the window size;

subtracting the ISF of each sample from a predetermined value and outputting the difference; and performing a predetermined window convolution on the difference, and outputting a window operation value of each sample.

15. The method of claim 14, further comprising the steps of:

generating a feedback value by multiplying outputs of a number of shift registers used for the window convolution by predetermined values and summing the products; and compensating an input for the window convolution by subtracting the sum from the difference.

16. The method of claim 14, further comprising the step of determining whether the input for the window convolution is a negative value, and if the input is a negative value, setting the input for the window convolution to '0'.

17. The method of claim 14, where the ISF, c(n) is calculated by $$c(n) = \begin{cases} 1, & |x(n)| \le A \\ \dfrac{A}{|x_n|}, & |x(n)| > A \end{cases}$$

where n is a sample index, A is a threshold, and |x(n)| is the magnitude of an $n^{th}$ sample.

18. The method of claim 14, wherein the ISF adjusting step comprises the step of, if the $n^{th}$ sample is an $(i+1)^{th}$ peak, adjusting the ISF by $$b(n) = \begin{cases} c(n), & P_{i+1} - P_i > W \\ \alpha \cdot c(n), & P_{i+1} - P_i \le W \end{cases}$$

where c(n) is the ISP, $P_i$ is the sample index of an $i^{th}$ peak, W is the window size represented as the number of samples, and a (>1) is a weighting value.

19. The method of claim 14, further comprising the steps of:

generating a final scaling factor for each sample by subtracting the window operation value of each sample from a predetermined value; and scaling a peak by multiplying the final scaling factor by the magnitude of each sample.

20. A transmission method in a wireless communication system, comprising the steps of:

generating sample data by modulating transmission data to multiple carriers;

detecting baseband samples having magnitudes exceeding a threshold;

calculating Intermediate Scaling Factors (ISFs) for the detected samples and setting the ISFs to '1' for undetected samples;

adjusting the ISF of each sample according to the spacing between successive peak samples, and generating a scaling factor for each sample by performing a window convolution based on the adjusted ISF;

separating a phase and an amplitude from each sample of the sample data;

scaling the amplitude of each sample by multiplying the amplitude by the scaling factor; and generating a complex signal by combining the scaled amplitude with the separated phase.

21. The transmission method of claim 20, further comprising the steps of:

modulating the complex signal to a radio frequency (RF) signal; and amplifying the power of the RF signal and transmitting the amplified RF signal.

22. The transmission method of claim 20, wherein the scaling factor adjusting step comprises the steps of:

comparing the spacing between the peak samples with a predetermined window size, and adjusting the ISFs of the peak samples if the spacing is less than the window size;

subtracting the ISP of each sample from '1' and outputting the difference;

calculating a window operation value for each sample by calculating a convolution of the difference and a predetermined window function; and generating the scaling factor of each sample by subtracting the window operation value from '1'.

23. The transmission method of claim 22, wherein the ISF calculation step comprises the step of calculating the ISF by $$c(n) = \begin{cases} 1, & |x(n)| \le A \\ \dfrac{A}{|x_n|}, & |x(n)| > A \end{cases}$$

where n is a sample index, A is a threshold, and |x(n)| is the magnitude of an $n^{th}$ sample.

24. The transmission method of claim 22, wherein the ISF adjusting step comprises the step of, if the $n^{th}$ sample is an $(i+1)^{th}$ peak, adjusting the ISF by $$b(n) = \begin{cases} c(n), & P_{i+1} - P_i > W \\ \alpha \cdot c(n), & P_{i+1} - P_i \le W \end{cases}$$

where c(n) is the ISP, $P_i$ is the sample index of an $i^{th}$ peak, W is the window size represented as the number of samples, and a (>1) is a weighting value.

* * * * *